United States Patent
Rufer et al.

(10) Patent No.: US 8,449,705 B1
(45) Date of Patent: May 28, 2013

(54) TECHNIQUES FOR MAKING PRESSURE VESSELS AS UNITARY STRUCTURES OF COMPOSITE MATERIALS

(75) Inventors: Markus Rufer, Hermosa Beach, CA (US); John Wainwright Newman, Mojave, CA (US); Collin Fletcher Corey, Santa Monica, CA (US)

(73) Assignee: Scorpius Space Launch Company Incorporated, Hawthorne, CA (US)

( * ) Notice: Subject to any disclaimer, the term of this patent is extended or adjusted under 35 U.S.C. 154(b) by 1217 days.

(21) Appl. No.: 12/207,434

(22) Filed: Sep. 9, 2008

(51) Int. Cl.
 *B29C 53/56* (2006.01)
(52) U.S. Cl.
 USPC .............................. 156/173; 156/155; 220/591
(58) Field of Classification Search
 USPC ................... 156/173, 155, 175, 169; 220/591
 See application file for complete search history.

(56) References Cited

U.S. PATENT DOCUMENTS

| | | | | |
|---|---|---|---|---|
| 3,357,875 A | * | 12/1967 | Corbin, Jr. | 156/425 |
| 5,693,166 A | * | 12/1997 | Crane | 156/175 |
| 2007/0175031 A1 | * | 8/2007 | Pham et al. | 29/889.2 |
| 2007/0205201 A1 | * | 9/2007 | Cundiff et al. | 220/591 |

* cited by examiner

Primary Examiner — Khanh P Nguyen
Assistant Examiner — Vishal I Patel
(74) Attorney, Agent, or Firm — Noel F. Heal

(57) ABSTRACT

A method for making large pressure vessels using a composite over-wrap process and a soluble mandrel structure that is scalable to a much larger vessel size than can normally be accommodated by the over-wrap process. The method allows the production of very large, lightweight vessels with no seams and no metal liners. Extensions of the method provide for the fabrication of fully embedded threaded or non-threaded bosses of composite materials, and fully embedded longitudinal and circumferential stringers or stiffeners.

4 Claims, 9 Drawing Sheets

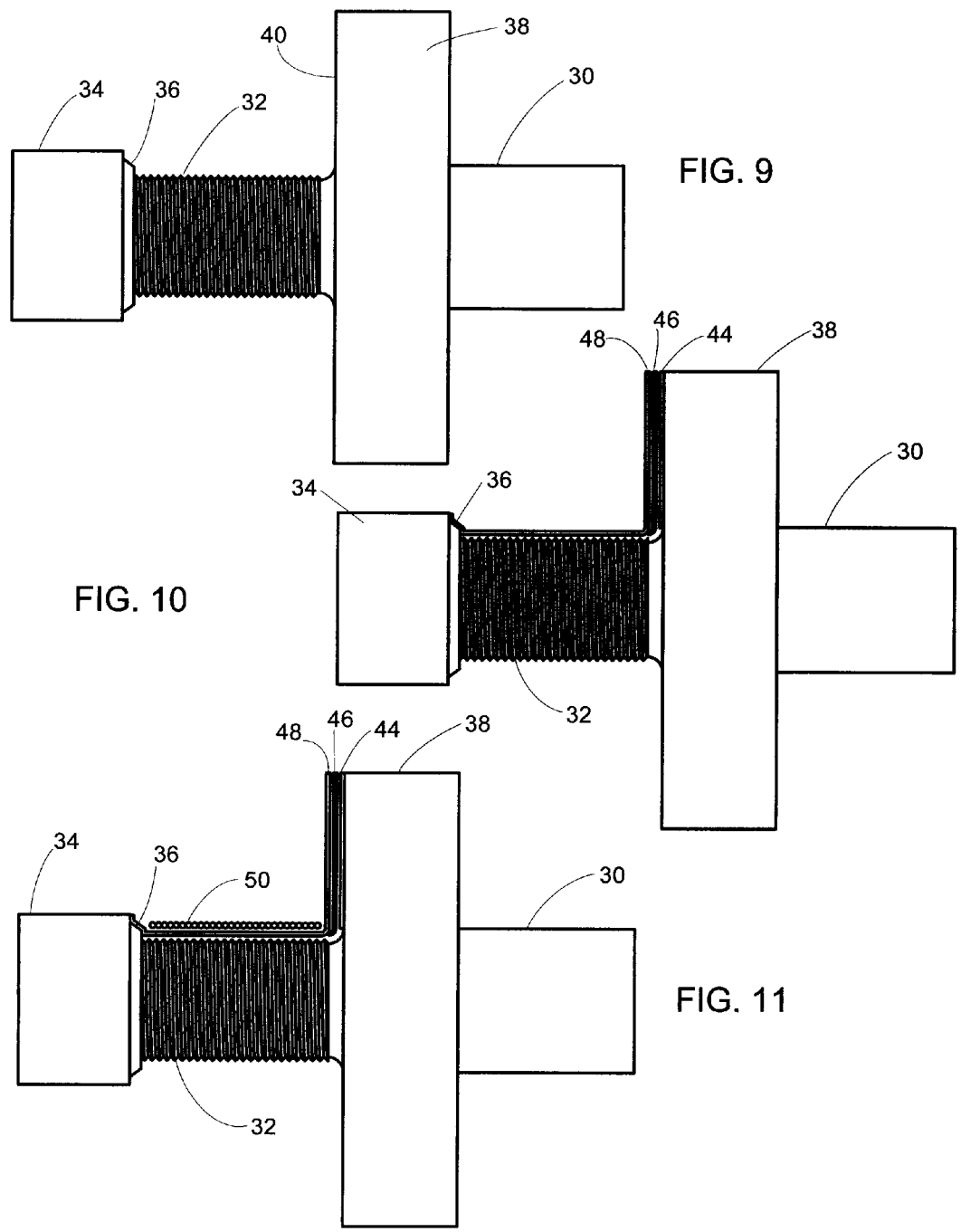

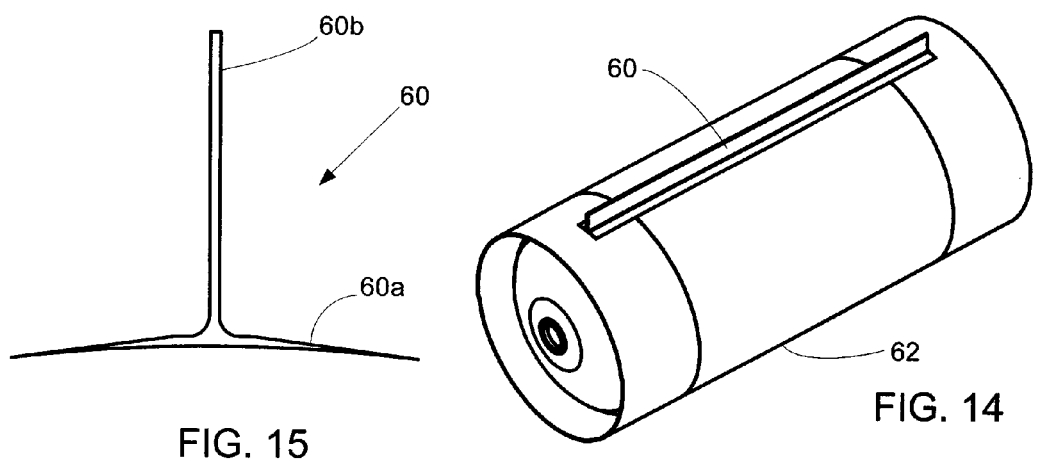
FIG. 15
FIG. 14
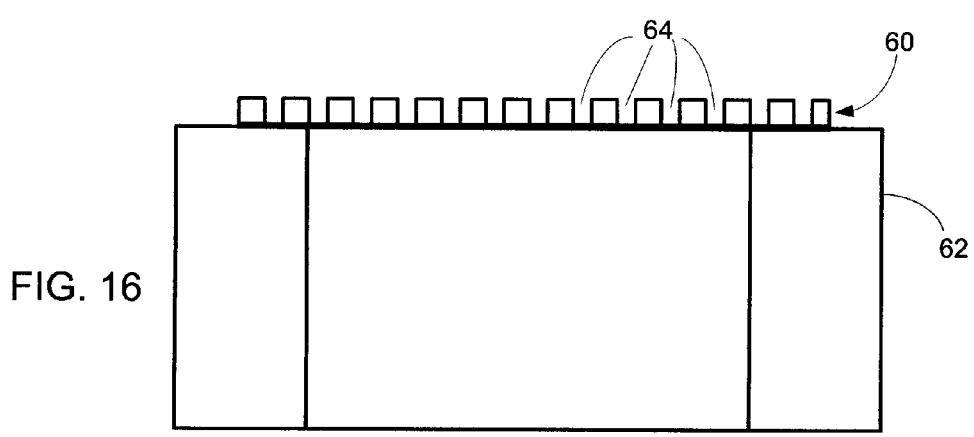
FIG. 16
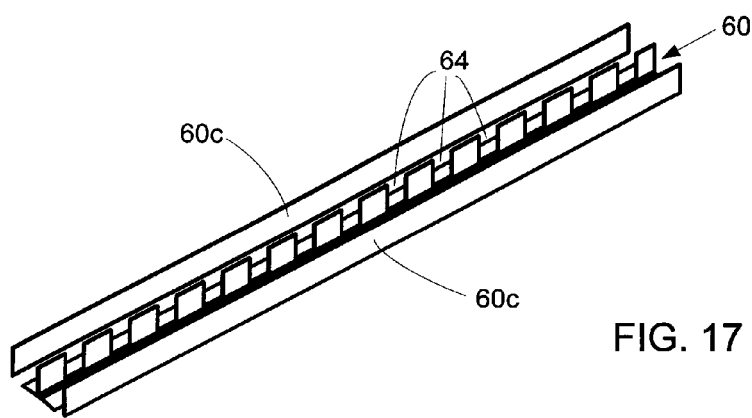
FIG. 17

TECHNIQUES FOR MAKING PRESSURE VESSELS AS UNITARY STRUCTURES OF COMPOSITE MATERIALS

BACKGROUND OF THE INVENTION

This invention relates generally to techniques for fabricating lightweight pressure vessels and, more particularly, for fabricating single-piece pressure vessels using only composite materials and without using a metal liner.

As is well known, composite materials, or composites, combine at least two constituent materials with different physical properties such that the constituents retain their individual properties in the composite, but also complement each other to provide overall properties unattainable from any of the constituents. Examples of composites in ancient times include the use of chopped straw in brick and the use of resin-soaked cloth tape to embalm Egyptian mummies. In current terminology, the term "composite" usually refers to a combination of fibrous material and a matrix material, such as an epoxy. The fibers provide strength in a selected direction or directions and the matrix binds the structure together and transfers forces between the fibers. By some definitions, composites also include laminar layers of materials and material particles embedded in a matrix. Because the present application is concerned with pressure vessels, the term "composites" or "composite materials" is intended primarily to encompass combinations of fibrous materials, such as graphite (carbon) fibers or glass fibers in a suitable matrix. It will be understood, however, that other lightweight composite structures may be used to the same effect.

Depending on their application, pressure vessels in general must comply with a set of high performance requirements, including structural rigidity under high pressure and the ability to provide good thermal insulation, corrosion resistance and chemical compatibility with the stored contents of the vessel. One common solution to satisfying these requirements is to make the vessel as a composite over-wrapped pressure vessel (COPV), formed by wrapping a relatively thin metal tank with a composite material to provide the required strength and thermal insulation properties without adding significant additional weight to the structure. The metal tank serves as an impervious liner to the composite outer layers of the vessel and may be joined to integral metal bosses with flanges for coupling fluid lines to the vessel. Composite over-wrapping is facilitated, in the case of a cylindrical vessel, by rotating the metal tank on its longitudinal axis to achieve the application of the composite material. Typically, overwrapping uses fibers or strands of carbon (or similar material such as Kevlar® or fiberglass) wrapped around the vessel in a continuous process and using a suitable matrix.

Although composite over-wrapped pressure vessels are perfectly satisfactory for many applications, they have significant drawbacks for aerospace applications, such as in launch vehicles and for spacecraft in general. When used in aerospace applications to store fuel or other substances, pressure vessels must not only have the required strength and rigidity of pressure vessels used on the ground, but they must also be as light as possible because a key limitation in spacecraft design is the cost to launch a desired mass into orbit about the Earth, or beyond. Another requirement for aerospace applications of pressure vessels is that they must be as immune as possible to changes in temperature. Unfortunately, common composites such as carbon composites have a lower coefficient of thermal expansion (CTE) than most metals. Compounding this problem, metals with a lower CTE, such as Invar® or Monel®, are much more dense than common metals such as steel or aluminum, thus increasing the overall weight of the pressure vessel if any of these lower CTE metals are used.

It has long been recognized, therefore, that the ideal form of construction of pressure vessels for aerospace and other applications is one that employs only composite materials to form a seamless vessel, without the use of a metal liner or other metal components. In the conventional composite overwrap pressure vessel (COPV) manufacturing process, a steel liner tank is used as a mandrel for over-wrapping with a composite material. An alternative process employs a soluble, usually water-soluble, mandrel that can be flushed out of the vessel at the end of the manufacturing process. The process is sometimes referred to as the wash-out mandrel process. Unfortunately, the material used to form such a mandrel is relatively fragile in its solid form and until now has been used only to make quite small vessels. One example of such material is AQUAPOUR®, manufactured by Advanced Ceramics Research, Inc., Tucson, Ariz. The water-soluble mandrel material has physical properties similar to those of plaster of Paris, which is very useful as a finishing or repair material but has only limited weight bearing ability. For larger pressure vessels such as those required for fuel storage in aerospace applications, a conventionally formed water-soluble mandrel cannot long withstand the force of gravity acting on the mass of the mandrel itself, as when mounted on a horizontal axis for over-wrapping. Also, the forces applied to the mandrel in the over-wrapping process are large enough to distort or break a mandrel made from soluble materials in a conventional way.

For the foregoing reasons, soluble mandrels have not been used to make pressure vessels greater than a few inches in diameter and length. Mandrels any larger than this are so fragile that they easily break during handling or lay-up of the composite material, or simply break under their own weight when mounted on a horizontal axis. Extremely large vessels, and in particular those that are large enough for workers to enter through an opening, can be formed by over-wrapping a rigid mandrel that is capable of disassembly from inside the pressure vessel. There is, however, a large class of pressure vessels that are smaller than this but are large enough that soluble mandrels cannot be conventionally used without significant risk of mandrel breakage during the process.

A known technique for fabricating composite pressure vessels is to make a larger vessel of several segments of lesser length, and then to join the segments by further over-wrapping them at each interface between segments. The joint over-wrapping material is usually referred to as a belly band. Unfortunately, all belly band approaches create opportunities for leaks to occur along the joint line. Therefore, they are not a favored form of construction in applications where the integrity of the pressure vessel is a top concern.

From the foregoing description of the art of composite over-wrapping, it will be appreciated that for the many years since space travel has become a reality, there has been a great need to provide pressure vessels that are lightweight but without compromise in strength, rigidity and integrity at high pressures. The present invention in accordance with one of its aspects achieves this goal.

A related drawback of pressure vessels of the prior art is that they typically utilize a metal boss at one end or both ends of the pressure vessel. The metal boss typically has a female thread formed in it, although it may in some cases have a male thread or use some other way of connecting with a fluid-carrying pipe. The metal boss is typically integrated with a metal mounting flange that has to be integrated into the composite material of the pressure vessel. Just as it is desirable to reduce the use of metal in the vessel itself, it is also a goal to reduce the use of metal in bosses and flanges used for coupling feed pipes to the vessel. In smaller tanks, of course, the additional weight of a boss and associated flange is not highly significant but in larger tanks the goal of weight reduction ideally requires the avoidance of metal in bosses and flanges as well as in the tank itself. Metal flanges pose an additional problem because of the CTE differential, mentioned earlier, between most common metals and composite materials. The ends of a pressure vessel, where inlet and outlet ports are typically installed, are inherently weak points in the vessel and the presence of expansion differentials can lead to cracks and, ultimately, to pressure failure.

It has long been a goal of designers of large pressure vessels to eliminate metal materials entirely, even from the boss and flange components that are conventionally formed in metal. Achieving this goal, however, has eluded pressure vessel designers for decades. One problem is that successive layers of composite material have a relatively low degree of adhesion between them. Merely stacking layers together can lead to de-lamination when stress is applied during the lay-up process or later. In addition, the laid-up fabric around a boss and flange must be applied both in a radial direction and in a longitudinal direction. Finally, it would seem that cutting a thread into the boss would necessarily cut through fibers in the composite and thereby destroy the structural integrity of the boss. The present invention achieves the goal of using composite materials for each threaded (or non-threaded) boss and flange, resulting in a unitary composite pressure vessel with no metal parts.

Another related requirement for pressure vessels in many applications is that they include integral "stringers" that extend longitudinally or circumferentially on the outside of the vessel. In some contexts, stringers are members that strengthen or stiffen a structure, such as a hull or fuselage. In the present context of pressure vessels, longitudinal and circumferential members are used not only as stiffeners but also to facilitate handling and installation of the vessel and to facilitate attachment of other associated components, or attachment of the pressure vessel itself to a structure in which it is to be installed. In the past, stringers have been superficially attached by bonding them to a completed composite over-wrapped pressure vessel (COPV). Consequently, there is always a risk of separation of the stringer or de-lamination of the vessel surface when a stringer is subject to stress. Complete integration of longitudinal and circumferential stringers is another aspect of COPV construction that has eluded designers prior to the present invention.

It will be appreciated from the foregoing that there has been a very long felt need for improvements in processes for fabrication of composite pressure vessels. In particular there has been a need for a process that allows for the production of very large pressure vessels without metal liners, as well as for a process that allows the integration of composite coupling bosses and associated flanges into a single unitary pressure vessel, and integration of composite stringers into the same unitary structure. The present invention accomplishes all of these goals, as will be apparent from the following summary.

BRIEF SUMMARY OF THE INVENTION

Briefly, and in general terms, the present invention resides in a method for fabricating a pressure vessel entirely of composite materials, even when the vessel is of relatively large size. A pressure vessel made in accordance with the present invention may also include at least one integral coupling boss and associated mounting flange, and one or more longitudinal or circumferential stringers that are also of composite materials and are integrated into the vessel.

More specifically, the invention as it pertains to a manufacturing method comprises the steps of: forming multiple hollow mandrel segments of a material that hardens into a solid but is soluble in a selected liquid, the mandrel segments including mandrel body segments and two mandrel end segments; forming one or more circularly symmetrical structural support elements of the same material as the mandrel segments, each structural support element being sized to fit internally within the mandrel segments and to join and support two adjacent mandrel segments; assembling the mandrel segments and structural support elements on a shaft, to form a hollow mandrel of desired shape and size; and then forming the pressure vessel by first laying up multiple layers of a composite fabric over the mandrel and then, after the lay up step, over-wrapping the mandrel with multiple layers of continuous fibers of a composite material, leaving at least one opening for installation of a coupling component. The resulting mass of composite material is then subject to a curing step to form the pressure vessel and the mandrel is removed by washing it from the vessel.

Even more specifically, the step of assembling the mandrel segments and structural support elements further comprises joining the mandrel segments and support elements together with an adhesive, and finishing the mandrel to a desired degree of smoothness. The mandrel segments comprise one or more hollow cylindrical segments and two dome-shaped end segments, while the structural support elements are generally circular discs, each having an outside diameter sized to fit within two adjacent mandrel segments to provide structural support during the assembling and over-wrapping steps. Preferably, the mandrel material is water soluble and the removal step comprises washing out the mandrel modules and structural support elements with water.

The method may further include forming a boss and an integral mounting flange from substantially the same materials as the pressure vessel and embedding the boss mounting flange into pressure vessel during the lay up step. The boss may be threaded or non-threaded depending on application requirements.

The method may also comprise the steps of forming at least one longitudinal stringer for attachment to the pressure vessel; and embedding the longitudinal stringer in the pressure vessel by over-wrapping a portion of the stringer into the vessel to form an integral part of it. The method may also comprise the additional steps of forming at least one circumferential stringer for attachment to the pressure vessel; and embedding the circumferential stringer in the pressure vessel by over-wrapping a portion of it into the vessel to form an integral part of it.

The invention may also be defined in terms of a pressure vessel made in accordance with any of the variations of the disclosed method. Formation of a boss and integral mounting flange is facilitated by use of a novel tool set, which is also described and illustrated in this specification.

It will be appreciated from the foregoing summary that the invention represents a significant advance in the field of manufacture of composite pressure vessels. In particular, the invention provides for the fabrication of very large seamless pressure vessels without the use metal liners. In addition, other aspects of the invention provide for the fabrication of composite coupling bosses and associated mounting flanges, and for the fabrication of fully embedded longitudinal and circumferential stringers. Other aspects of the invention will become apparent from the following more detailed description, taken in conjunction with the accompanying drawings, which will now be briefly described.

BRIEF DESCRIPTION OF THE SEVERAL VIEWS OF THE DRAWINGS

FIG. 9 is a fragmentary elevation of the tool set of FIG. 8.

FIGS. 10-12 are further fragmentary elevations, partially in diagrammatic section, depicting how layers of composite material are laid up on the tool set.

FIG. 14 is a perspective view of a composite over-wrapped pressure vessel with a single longitudinal stringer placed in position.

FIG. 15 is a cross-sectional view of a longitudinal stringer.

FIG. 16 is an elevation of the pressure vessel of FIG. 14, showing more detail of the longitudinal stringer.

FIG. 17 is a diagrammatic view showing components of the longitudinal stringer of FIG. 16.

DETAILED DESCRIPTION OF THE INVENTION

Figure 1:
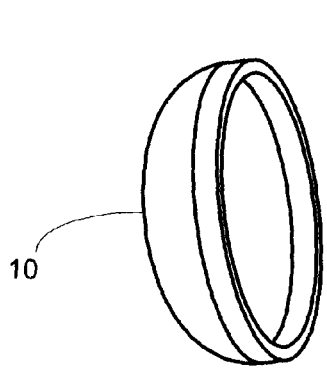
FIG. 1 is a perspective view of a domed end segment of a soluble mandrel.
Figure 2:
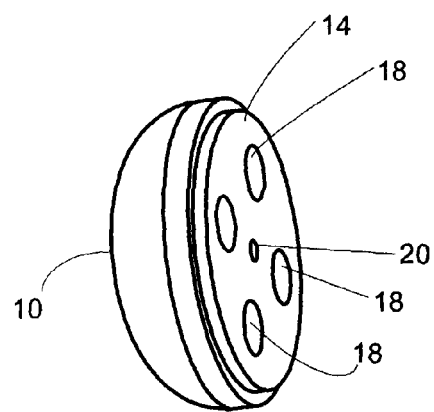
FIG. 2 is a perspective view of the domed end segment of FIG. 1 together with a support disc segment inserted part-way into the end segment.

As shown in the drawings, the present invention encompasses a method, and more particularly several sub-methods, for making pressure vessels from composite materials, such that the use of metals is minimized or totally eliminated. The use of metals not only adds unwanted weight to a pressure vessel but also increases the risk of defects or failures due to the difference in the coefficients of thermal expansion of composites on one hand and common metals on the other. Although weight reduction of pressure vessels has long been a goal in the aerospace industry, prior to this invention no-one has been able to apply the composite over-wrapped pressure vessel (COPV) manufacturing technique to large vessels without metal liners. Similarly, the integration of threaded coupling bosses and longitudinal and circumferential stringers to composite pressure vessels has also proved to an elusive goal.

In accordance with the present invention, large pressure vessels can be formed using a composite over-wrapping technique that employs a mandrel that is soluble in a liquid, preferably water. In particular, the mandrel is constructed to support the over-wrapping process for vessels of much larger lengths and diameters than was previously possible using soluble mandrels. The present invention also extends the composite over-wrapping process to the fabrication of embedded composite polar bosses, and integrated composite longitudinal and circumferential stringers.

As shown diagrammatically in FIGS. 1-6, a soluble mandrel is made as a combination of selected segments of three types: (a) an end dome segment 10 (FIGS. 1-6) of hollow approximately hemispherical shape, (b) a hollow cylindrical segment 12 (FIGS. 4-6), and (c) a support disc segment 14 (FIGS. 2-5). These three segments are made using conventional and well known techniques, as will be briefly described in the following paragraphs.

The component segments of a soluble mandrel are made by pouring the mandrel material into suitable molds. The mandrel material may be any suitable soluble, and preferably water soluble material. The presently preferred material for this purpose is a water soluble compound sold under the name AQUAPOUR®, manufactured by Advanced Ceramics Research, Inc., Tucson, Ariz. This water-soluble mandrel material has physical properties similar to those of plaster of Paris. Each cylindrical segment 12 is molded in a two-part mold with a longitudinal split plane that is coplanar with the longitudinal axis of the cylindrical segment. Basically, the mold has an outer surface with a diameter the same as the desired outer diameter of the molded cylindrical segment, and an inner surface provided by a cylindrical displacement plug. The soluble material in liquid form is poured into the mold and appropriate end flanges are employed to retain the liquid in the mold. The cylindrical displacement plug is sized to create a wall thickness of approximately 4% of the outer diameter of the completed cylindrical segment 12. Typically, the liquid material takes approximately eight hours to solidify in the mold at room temperature, after which the two mold halves (forming the outer surface of the mold) are separated and the solidified cylindrical segment 12, with the displacement plug still inside it, is placed in a curing oven to dry out at a temperature of approximately 110° F. for a further eight hours. After this curing time, the displacement plug can be easily removed because the coefficient of thermal expansion (CTE) of the mandrel material is substantially higher than that of the plug. It will be understood that the molding procedure outlined above is not necessarily the only one that could be used. The only requirement is that a hollow cylindrical segment should be produced.

The dome segments 10 of the mandrel are molded using the same conventional steps outlined above for the cylindrical segments 12. Each dome segment 10 is configured to accommodate a desired flange or boss element, as will be further described below, and includes a central opening at the central crown of the dome to accommodate a shaft 16, which can be seen in FIGS. 3-6. Therefore, the mold used to make a dome segment 10 should have an outer mold and displacement plug that are shaped to form the desired opening for the shaft 16. As in the process for molding the cylindrical segments 12, the dome segments 10 can be molded using a two-part mold that splits along a plane that extends diametrically through the dome segment.

Each support disc segment 14 is basically in the shape of a solid wheel, or alternatively can be considered to be a mostly solid cylinder of relatively short length. The disc segment 14 may advantageously include multiple holes 18 (FIGS. 2-5) through its thickness, to facilitate later removal of the entire mandrel structure by washing out with water. The disc segment 14 should also include a central opening 20 (best shown in FIG. 2), for mounting on the shaft 16. The disc segments 14 may also be molded using techniques described above for the cylindrical segment 12. The principal difference, of course, is that the disc segment 14 is largely a solid structure and a large displacement plug is not required. Instead, small displacement plugs are used to form the holes 18 and the central opening 20. A critical feature of the disc segment 14 is that its outer diameter should be sized to fit snugly inside either a cylindrical segment 10 or a dome segment 12.

Figure 3:
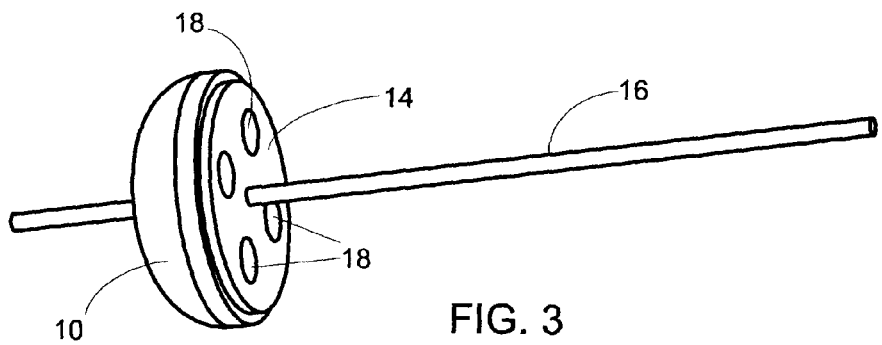
FIG. 3 is a perspective view of a mandrel assembly including the end segment and support disc segment of FIG. 2 mounted on a shaft.
Figure 4:
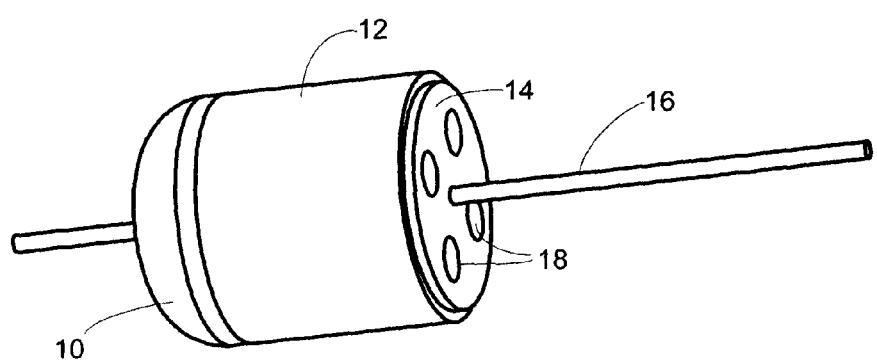
FIG. 4 is a perspective view of the mandrel assembly of FIG. 3 together with a cylindrical segment and an additional disc support segment mounted on the shaft.
Figure 5:
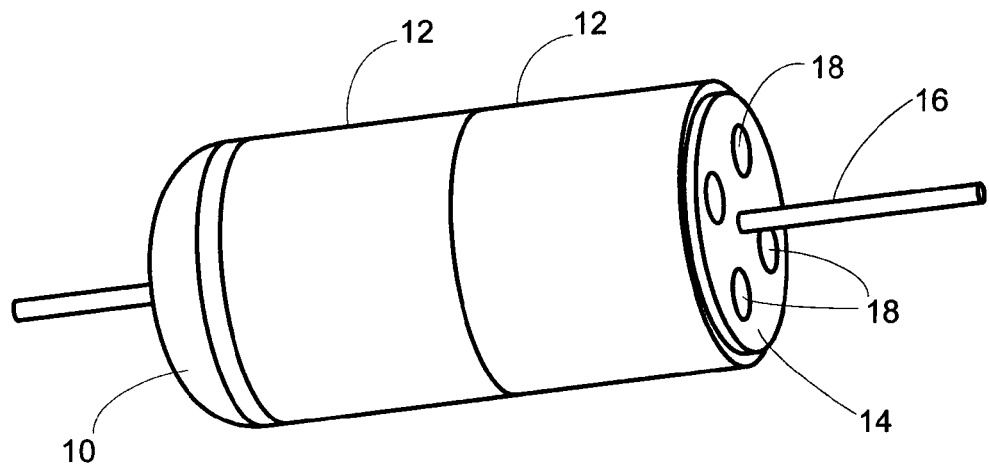
FIG. 5 is a perspective view of the mandrel assembly of FIG. 4 together with an additional cylindrical segment and an additional disc support segment mounted on the shaft.
Figure 6:
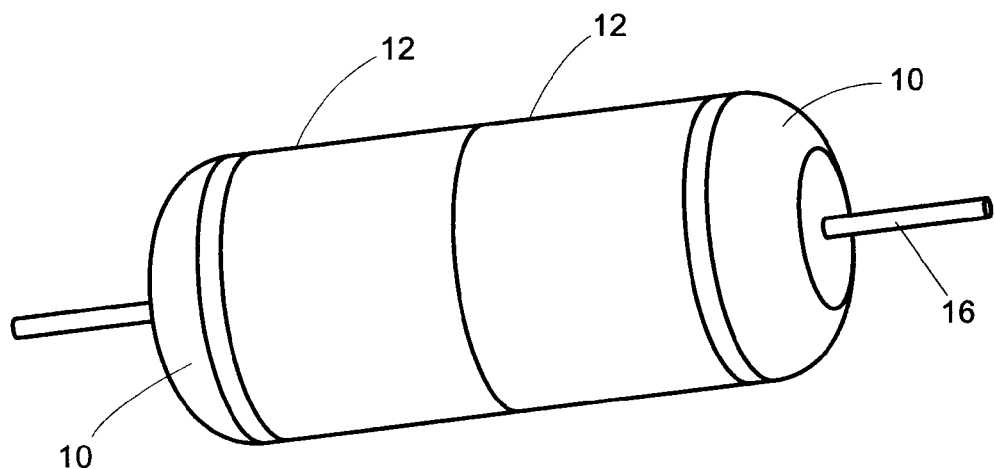
FIG. 6 is a perspective view of a complete mandrel assembly, including the assembly of FIG. 5 together with a second domed end segment, all mounted on the shaft.

After two dome segments 12 and an appropriate number of cylindrical segments 10 and support disc segments 14 are molded and cured, they are all mounted on the shaft 16. A support disc segment 14 is positioned between each dome segment 12 and adjacent cylindrical segment 10, an additional disc segment is positioned between adjacently located cylindrical segments. For example, FIG. 3 shows a support disc segment 14 mounted on the shaft 16 and engaged in a dome segment 10 and FIG. 4 shows the mandrel assembly after the addition of a cylindrical segment 12 and another support disc segment 14. Next, FIG. 5 shows the mandrel assembly after an additional cylindrical segment 10 and another support disc segment 14 have been placed on the shaft 16. Finally, FIG. 6 shows the assembly after the second dome segment 12 has been placed on the shaft 16 in engagement with the already installed support disc segment. Each of the support disc segments 14 is engaged over approximately half of its thickness into each of two adjacent segments, which may be either a dome segment 10 or a cylindrical segment 12.

An important aspect of the invention is that the mandrel structure consists of the segments or modules as described and illustrated. The assembly shown in FIGS. 5 and 6 has two cylindrical segments 12 but it will be understood that longer mandrels may employ a greater number of cylindrical segments and shorter mandrels may have only one cylindrical segment of a desired length. All of the segments are preferably held in place by relatively short "stitches" of epoxy. Use of long epoxy beads is not a preferred technique because the larger portions of epoxy may compromise the wash-out properties of the mandrel at the end of the process.

The method described results in accurately aligned segments and a mandrel assembly that is dimensionally accurate. If necessary, however, a grinding tool can be used to smooth out any minor defects at the segment joint lines resulting from misalignment of the segments. Because the solidified mandrel assembly is porous it must be sealed with a sealing agent, such as AQUASEAL® (Advanced Ceramics Research, Inc., Tucson, Ariz.), followed by the application of several coats of a release film such as PVA (polyvinyl alcohol), available from a number of suppliers, e.g., Eager Polymers, Inc., Chicago, Ill.

The mandrel assembly is next used in a conventional composite lay-up process, in which a fiber material containing carbon or glass fibers is wrapped around the mandrel assembly in a matrix material such as an epoxy. Typically, the mandrel is mounted with its shaft 16 in a horizontal orientation and is slowly rotated as the fibers are fed from spools onto the mandrel surface, in what is now a conventional process of fabrication using composite materials. What is novel in the case of the invention is that the mandrel contains no metal and may be of almost any desired size. During the lay-up process, the mandrel is subject to substantial mechanical stresses. Yet the modular structure of the mandrel assembly can withstand these stresses, as well as those resulting from handling the mandrel during its final assembly and mounting in the lay-up apparatus.

Over-wrapping of the mandrel continues until a desired thickness is reached. Then the completed product is cured. Finally, the mandrel assembly is washed out of the product with water. This step is facilitated by the structure of the support disc segments 14, the holes 18 in the disc segments allowing water to flow through the completed vessel and dissolve the mandrel completely.

Making a threaded boss from composite materials and integrating that boss with a composite pressure vessel are also goals of the present invention. Carbon fiber bosses are preferably made to conform to the proven design features and shapes as the metal bosses that they replace. They are designed to be transparent to an operator, so that the pressure vessels become line replaceable units that can be fitted to standardized connectors, fasteners and gaskets with common tools. As will be described in more detail, the bosses and associated flanges are being embedded with an interleaving technique during the build-up of the tank body and as a result "melt" into the surrounding material to form a unitary structure, much like a casting. A central threaded hole in the boss is formed, not cut, so that the enclosing carbon fabric strands are not disrupted or structurally compromised. The fiber orientation in the lay-up must be such as to provide longitudinal and radial strength to withstand the forces that a boss is subjected to in operation. This method provides thread qualities that are comparable to or better than the metal threads they replace.

Figure 7:
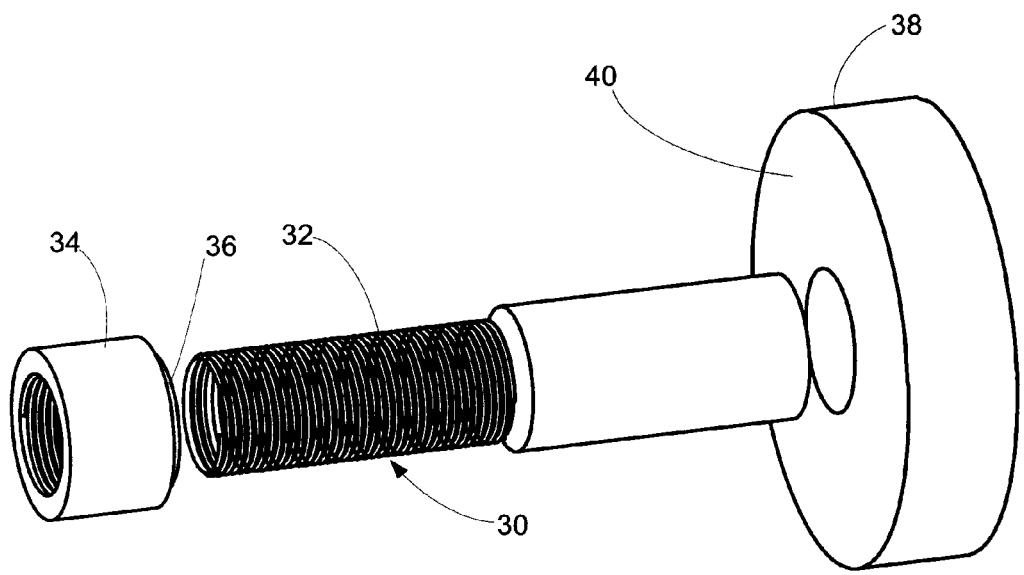
FIG. 7 is a perspective view showing the components of a tool set used to form a composite threaded boss and associated mounting flange.
Figure 8:
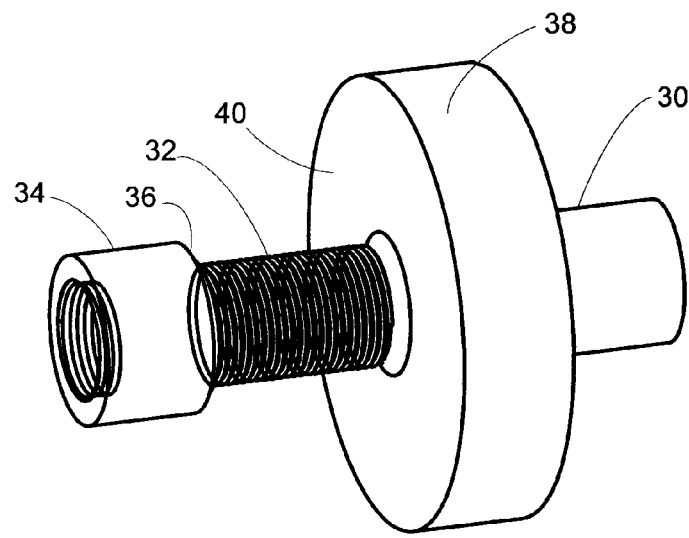
FIG. 8 is a perspective view of the tool set of FIG. 7 as assembled for use.
Figure 13:
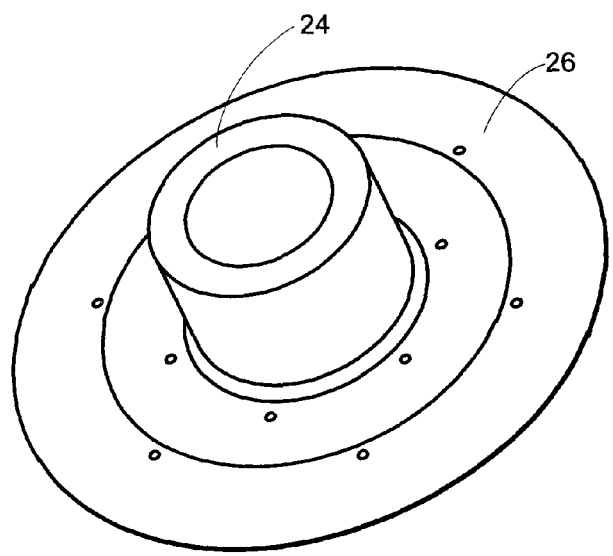
FIG. 13 is a perspective view of a composite internally threaded boss and associated mounting flange, after removal from the tool set of FIGS. 7-12.

FIGS. 7-9 depict the components of a tool set for lay-up of a composite internally threaded boss 24 (FIG. 13) and an integral mounting flange 26 (FIG. 13). The tool set comprises a metal shaft 30, one portion (32) of which is externally threaded to provide a pattern or mold for the boss 24 to be formed with a female thread. A second component of the tool set is an internally threaded nipple 34, which, as shown in FIGS. 8 and 9, is assembled by engaging the threaded portion 32 of the shaft 30. The nipple 34 in this example has a chamfered edge 36, which will form an internal chamfer on the fabricated boss 24, to accommodate an O-ring seal (not shown) when a feed line is coupled to the boss. The third component of the tool set is a rigid disc 38 having a face 40 that is either flat or is contoured to form a concave face of the mounting flange 26 associated with the boss 24. The disc 38 has a central opening sized to fit the disc on the non-threaded portion of the shaft 30, near the proximal end of the threaded portion 32.

Figure 12:
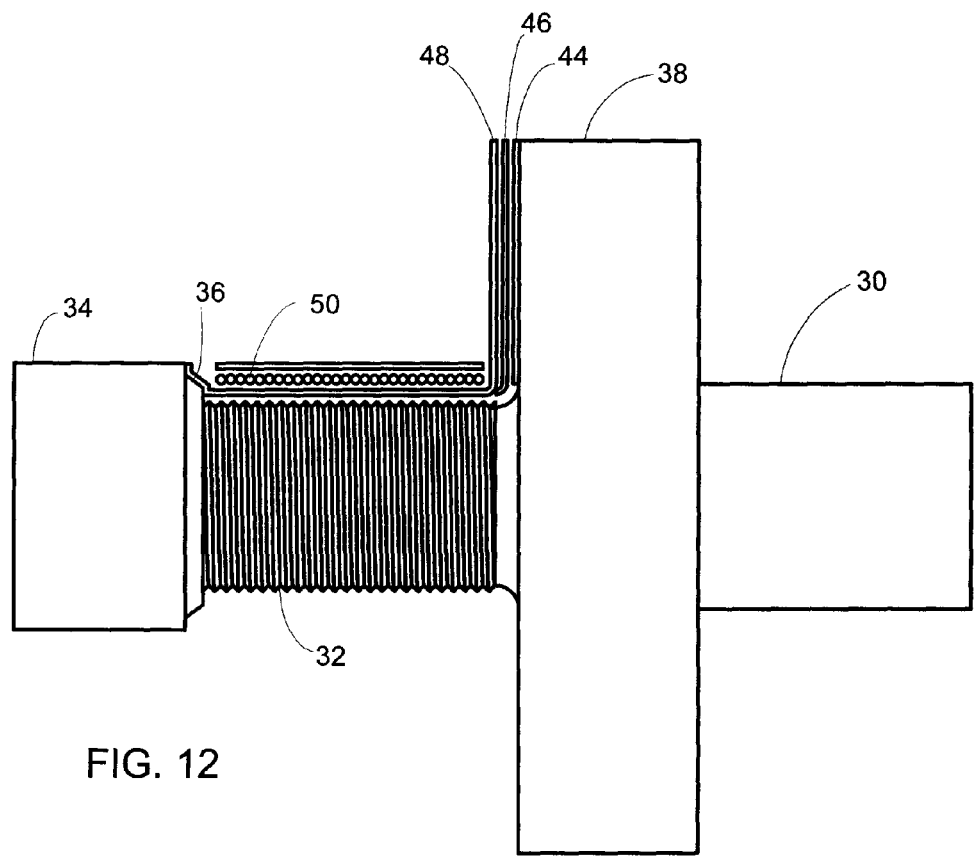

The lay-up process, using the assembled tool set as shown, follows the steps of:

(A) Laying a peel ply 44 (FIG. 12) against the disc 38 to facilitate removal of excess resin at the end of the process.

(B) Laying a ply 46 of bi-directional carbon cloth in the form of a doily over the peel ply 44.

(C) Laying a bi-directional carbon cloth 48 at 45° to the axis of the tool and stretching longitudinally along the threaded portion 32 to the nipple 34.

(D) Winding a layer 50 of unidirectional carbon filament over the threaded section 32 and against the nipple 34. This step will press the cloth underneath into the thread of the rod to conform to its shape without breaking the fiber strands.

(E) Repeating steps (B), (C) and (D) until a desired overall thickness is achieved, interleaving the cloth and layers applied in steps (B) and (C) and applying a helix wind of carbon filament in step (D) at every repetition, so that the lower layers get firmly compressed into the threaded portion 32 of the shaft 30.

After a conventional curing step, the boss 24 and integral flange 26 are removed from the tool set, preferably at very cold temperatures to facilitate separation. Final trimming and cleaning can then be performed, to yield the product shown in FIG. 13. The boss 24 and flange 26 are incorporated into the over-wrap process and encapsulated the same way as the metal bosses that they replace. In brief, the boss 24 and flange 26 are positioned on the shaft 16 of the mandrel assembly shown in FIG. 6 before completion of the over-wrapping process. Plies of composite material applied to the dome sections 10 of the mandrel assembly are used to embed the mounting flange 26 into the dome section of the fabricated vessel. The flange 26 is sized and contoured to fit perfectly over the domed end segment 10 of the mandrel assembly and becomes fully integrated with the vessel as the over-wrapping process is concluded. Unlike a metal flange, however, the flange 26 is of basically the same material as the entire pressure vessel. Therefore, stress and de-lamination issues associated with metal flanges are eliminated, as are concerns about corrosion. Thread quality and structural integrity are ensured because the thread is not cut, i.e., the individual strands of the carbon fabric that forms the thread are not interrupted and therefore the tensile strength of the material is not compromised. The transition lay-ups employed, between longitudinal and radial directions, avoid concerns of possible separation between layers when traditional stack up approaches are used. In effect, the method yields an organic product in the sense that it is made from one set of parent materials (carbon fiber and resin) used uniformly throughout the entire body of the vessel, which means that the reaction to temperature or pressure induced stresses is uniform and normalized, and not disturbed by the dissimilar reaction of metal flange materials.

The following paragraphs describe an additional feature of composite pressure vessels made in accordance with the invention. Stringers or stiffeners were in the past bonded to composite pressure vessels, and the bonding points were often subject to additional stresses and provided potential defects in the structural integrity of the vessels. Relatively thin composite vessels without metal liners are, of course, particularly vulnerable to failure at points of superficial attachment of stringers or stiffeners.

In accordance with this aspect of the invention, longitudinal and circumferential stingers may be fully integrated into the structure of a composite pressure vessel during the over-wrapping or lay-up process. In the extended method of the invention, longitudinal stringers, such as the one shown at 60 in FIG. 14, extend longitudinally along the outer wall of a not yet completely over-wrapped pressure vessel 62. FIG. 15 shows the cross-sectional shape of the stringer 60. Basically, the stringer 60 in cross section has an inverted T shape, including a base strip 60a that is laid along the outer surface of the vessel 62 and an upright strip 60b that extends radially out from the vessel wall. Both strips 60a and 60b are made from carbon fiber fabric and the two strips are joined with additional layers of fabric.

Figure 18:
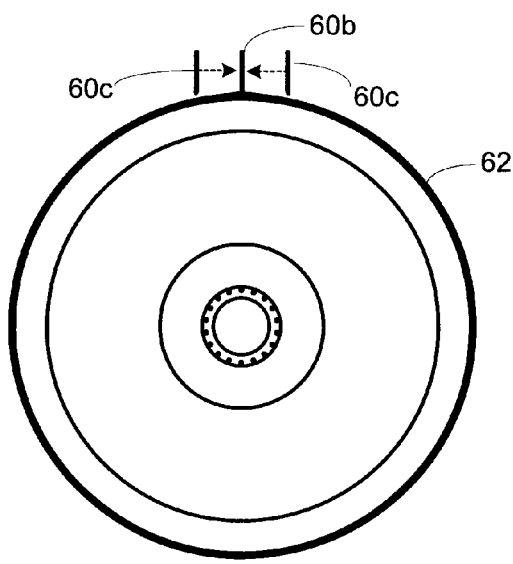
FIGS. 18 and 19 are diagrammatic end views of the pressure vessel of FIG. 14, showing how the longitudinal stringer is formed.
Figure 19:
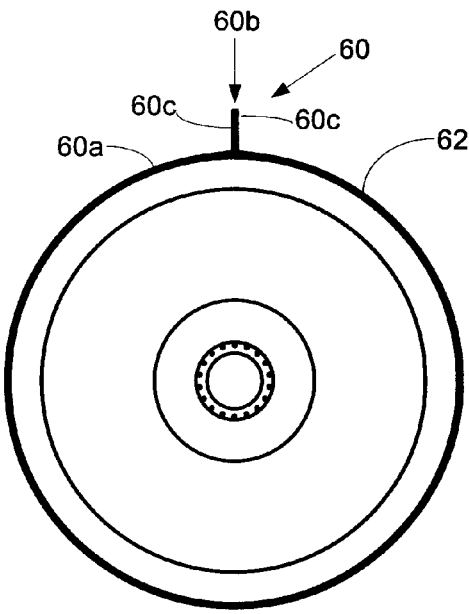

Integrating this T-shaped stringer 60 into the structure of the vessel 62 is no trivial matter because plies of the composite material cannot be readily applied circumferentially over the stringer. For this reason, the stringer 60 is pre-formed (milled) to include a succession of slots or cutouts 64 in the vertical part 60b of its T section, as depicted diagrammatically in FIGS. 16 and 17. During the over-wrap process, carbon fiber material is wound over the stringer(s) 60 but only in the regions of the cutouts 64. Finally, close-out strips 60c of approximately the same size as the upright strips 60b are applied to each face of the upright strip and bonded in place, as shown in FIGS. 18 and 19. Gaps are filled with a resin-fiber slurry to complete the longitudinal stringer structure. In practice, the longitudinal stringers 60 should be embedded in the composite vessel wall when the over-wrap process is nearly completed.

Circumferential stringers should ideally extend completely around the vessel 62 and should be integrated with each intersecting longitudinal stringer 60. Therefore, If a circumferential stringer system is required, the segments of it need to be incorporated with the longitudinal stringer system prior to completing over-wrap of the vessel.

Figure 20:
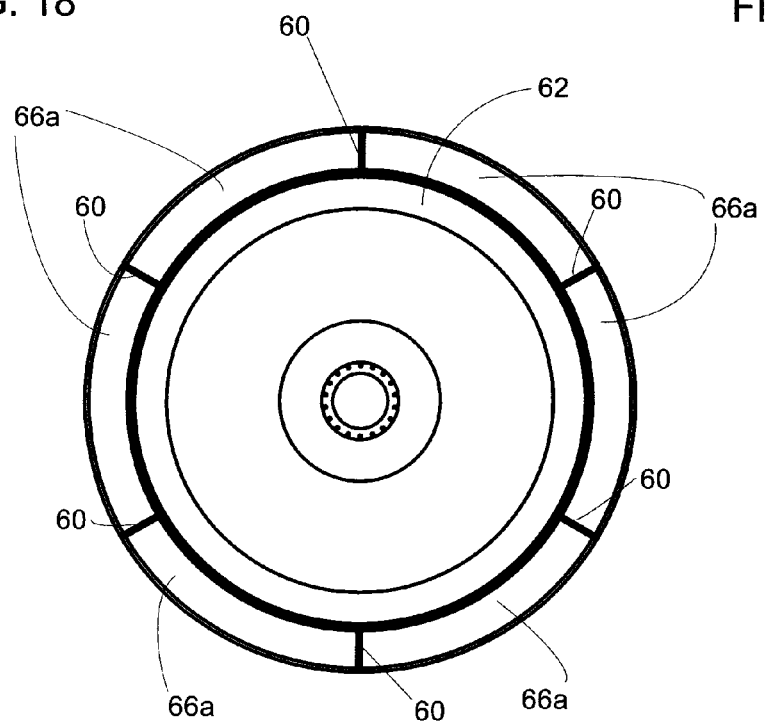
FIG. 20 is an end view of a composite over-wrapped pressure vessel showing a six-segment circumferential stringer in relation to six longitudinal stringers.

The following example describes the construction of a six-stringer system, i.e., one having six longitudinal stringers equally spaced around the cylindrical vessel 62. The basic method steps for forming each circumferential stinger are:

(A) First producing six T-shaped profile arc segments 66a (FIG. 20). These are basically like the longitudinal stringers 60 except that they are formed on a cylindrical mold (not shown) or directly on the vessel 62 to provide their arcuate shape. Each of the segments 66a rests against the upright portions 60b of the longitudinal stringers 60 at both ends of each segment and is referred to herein as the lower half of the circumferential stringer segment.

Figure 23:
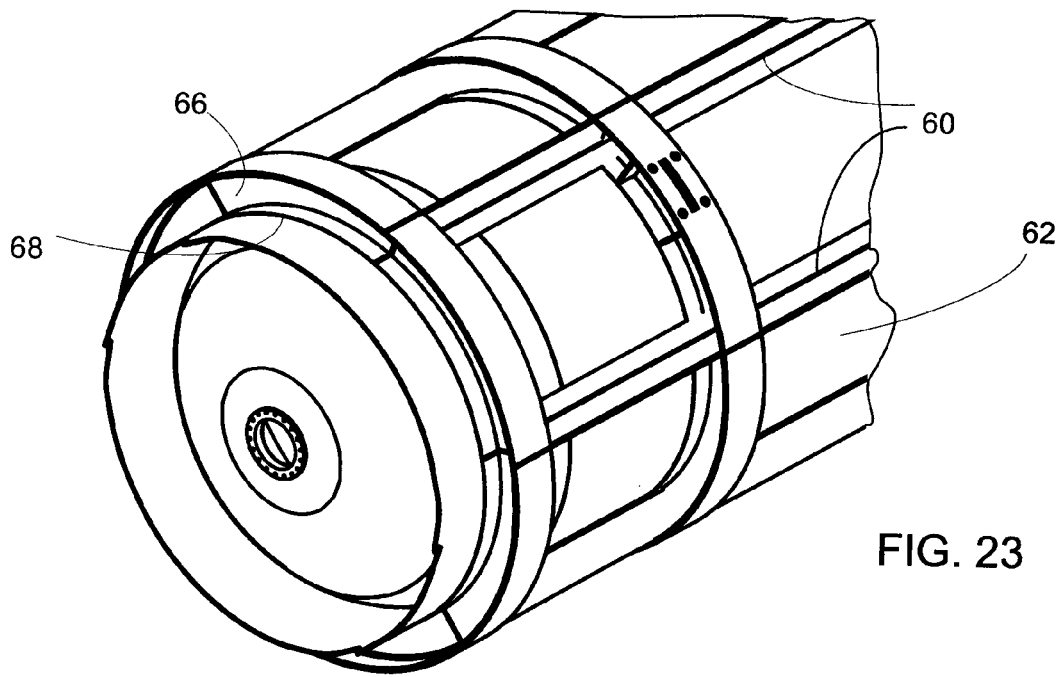
FIG. 23 is a view similar to FIG. 22 but showing the circumferential stringer almost completely constructed.

(B) Embedding the segment lower halves 66a in position on the vessel 62 by bonding in place with resin and over-wrapping with composite material, as shown at 68 in FIG. 23, leaving an upright portion extending radially out from the vessel. Each circumferential stringer 66 is aligned with a cutout 64 in intersecting longitudinal stringers 60, to facilitate subsequent over-wrapping of the circumferential stringers.

Figure 22:
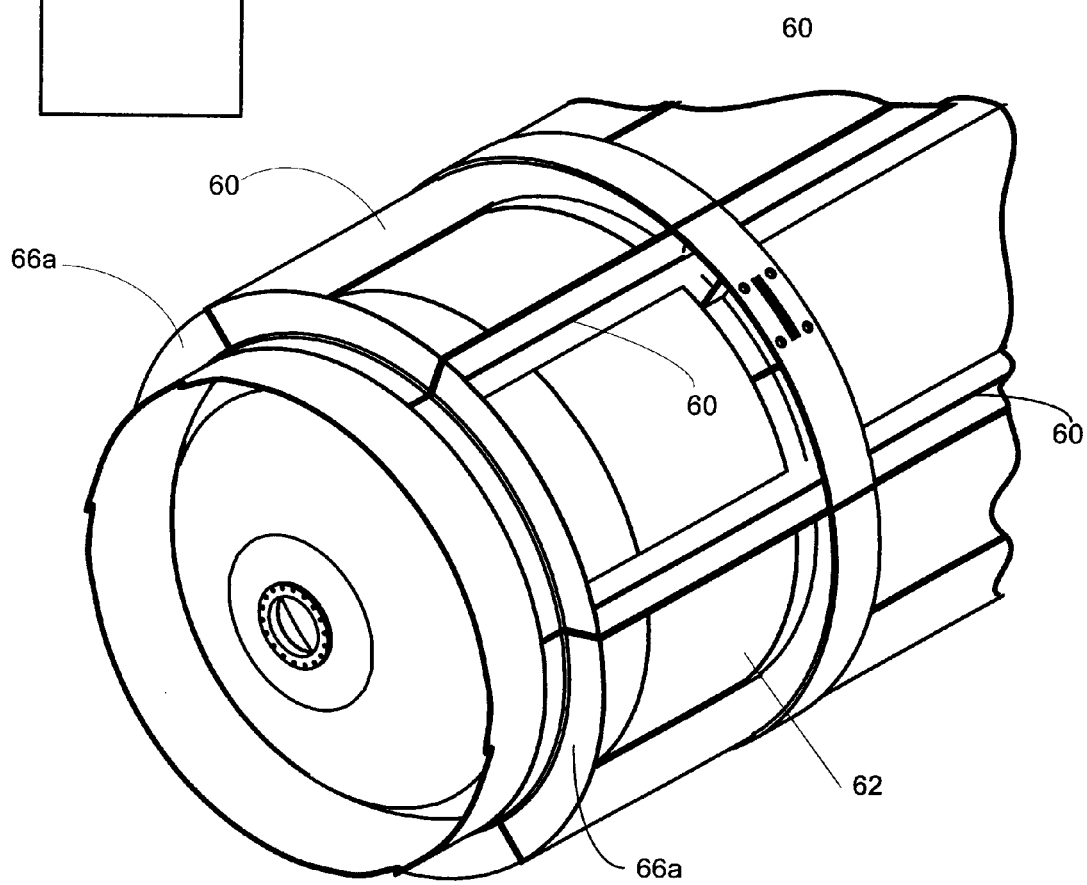
FIG. 22 is a perspective view of a composite over-wrapped pressure vessel showing multiple longitudinal stringers and a partially constructed circumferential stringer.

(C) Producing an upper half 66b (FIG. 22) of each circumferential stringer segment. This is basically another T-shaped segment except that the upright portion of this T shape extends radially inward and includes a gap or channel to accommodate the outwardly extending upright portion of the lower half segments 66a produced in steps (A) and (B), thus completing an I-beam profile.

Figure 21:
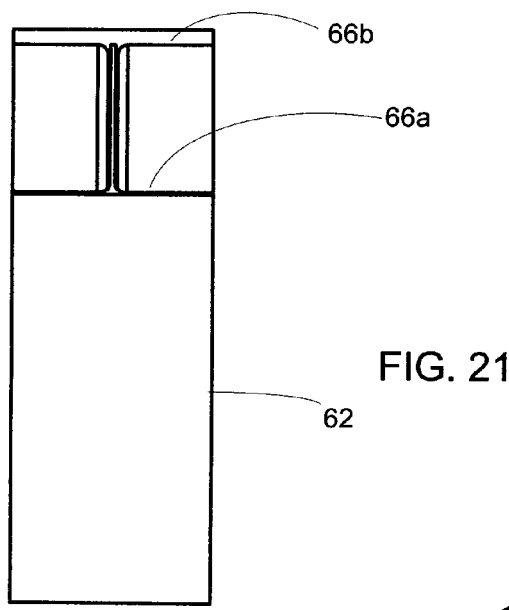
FIG. 21 is a fragmentary cross-sectional view showing more detailed structure of a circumferential stringer.

(D) Assembling the upper half segments 66b onto the lower half segments 66a in place on the vessel 62, as shown in cross section in FIG. 21, and securing with resin. The six segments now form a ring-shaped bulkhead around the vessel.

Figure 24:
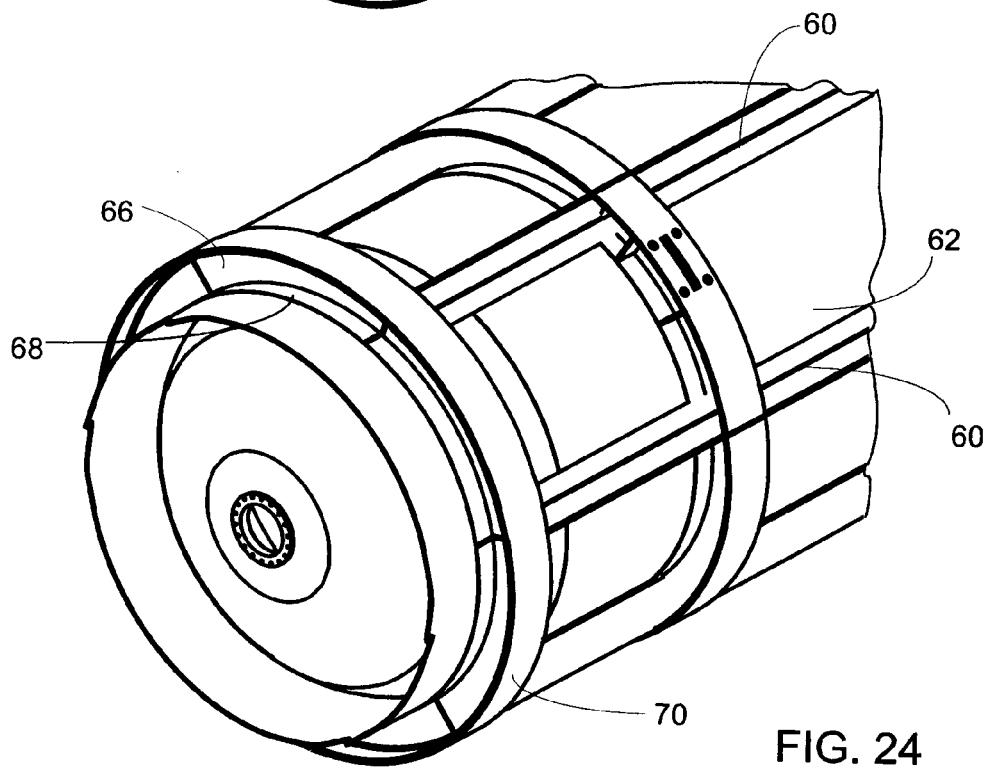
FIG. 24 is a view similar to FIG. 23 but showing completion of the circumferential stringer by over-wrapping its outer surface.

(E) Winding a fiber layer 70 (FIG. 24) over the outer surface of the circumferential stringer 66 to further bind the six segments of the stringer together. To facilitate this step, the upper half 66b of the circumferential stringer may be contoured to help retain the fiber layer 70 on the stringer during the winding process.

The foregoing steps are performed toward the end of the over-wrapping process, which, as already mentioned, is followed by a conventional curing step. The stringer system described integrates into the outer layers of the tank wall and does not rely on the adhesive force of a bonding agent for structural integrity. The materials used are of the same parent materials and composition as the tank body and do not have dissimilar thermal expansion behavior to that of the tank itself.

It will be appreciated from the foregoing that the present invention represents a significant advance in the field of composite pressure vessel manufacture. In particular, the invention provides a novel technique for using very large soluble mandrels to make composite pressure vessels with a conventional over-wrap process. In addition, the invention encompasses the fabrication of polar bosses and associated flanges entirely from composite materials, and the fabrication of a composite stringer system having longitudinal and circumferential stringers that are integrated into the pressure vessel.

It will also be appreciated that although the present invention has been described and illustrated in detail by way of example, various modifications may be made without departing from the spirit and scope of the invention. Accordingly, the invention should not be limited except as by the appended claims.

The invention claimed is:

1. A method for fabricating a seamless and liner-less pressure vessel as a single-piece structure of composite material, the method comprising the steps of:
    forming multiple hollow mandrel segments of a material that hardens into a solid but is soluble in a selected liquid, the mandrel segments including mandrel body segments and two mandrel end segments;
    forming one or more circularly symmetrical structural support elements of the same material as the mandrel segments, each structural support element being sized to fit internally within the mandrel segments and to join and support two adjacent mandrel segments;
    assembling the mandrel segments and structural support elements on a shaft, to form a hollow mandrel of desired shape and size;
    over-wrapping the mandrel with multiple layers of a composite material;
    curing the composite material to form a hollow pressure vessel; and
    removing the mandrel by washing it from the pressure vessel;
    wherein the over-wrapping step is preceded by a lay-up step in which multiple layers of a composite fabric are laid over the mandrel;
    and wherein the method further comprises
        separately forming a boss and an integral mounting flange from substantially the same materials as the pressure vessel; and
        incorporating the boss mounting flange into the pressure vessel before completion of the over-wrapping step, by positioning the boss and integral mounting flange on the mandrel shaft and then continuing the over-wrapping step to completion, whereby the boss is incorporated into the pressure vessel without need for access to the pressure vessel interior.

2. A method as defined in claim 1, wherein the step of separately forming a boss comprises forming an integral internal thread on the boss without cutting any layers of composite material.

3. A method for fabricating a seamless and liner-less pressure vessel as a single-piece structure of composite material, the method comprising the steps of:
    forming multiple hollow mandrel segments of a material that hardens into a solid but is soluble in a selected liquid, the mandrel segments including mandrel body segments and two mandrel end segments;
    forming one or more circularly symmetrical structural support elements of the same material as the mandrel segments, each structural support element being sized to fit internally within the mandrel segments and to join and support two adjacent mandrel segments;
    assembling the mandrel segments and structural support elements on a shaft, to form a hollow mandrel of desired shape and size;
    over-wrapping the mandrel with multiple layers of a composite material, leaving at least one opening for installation of a coupling component;
    curing the composite material to form a hollow pressure vessel;
    removing the mandrel by washing it from the pressure vessel;
    forming at least one longitudinal stringer for attachment to the pressure vessel; and
    embedding the at least one longitudinal stringer in the pressure vessel by over-wrapping a portion of the stringer into the vessel to form an integral part thereof, wherein the embedding step is performed as part of the step of over-wrapping the mandrel and whereby the at least one longitudinal stringer is embedded as an external appendage to the pressure vessel.

4. A method for fabricating a seamless and liner-less pressure vessel as a single-piece structure of composite material, the method comprising the steps of:
    forming multiple hollow mandrel segments of a material that hardens into a solid but is soluble in a selected liquid, the mandrel segments including mandrel body segments and two mandrel end segments;
    forming one or more circularly symmetrical structural support elements of the same material as the mandrel segments, each structural support element being sized to fit internally within the mandrel segments and to join and support two adjacent mandrel segments;
    assembling the mandrel segments and structural support elements on a shaft, to form a hollow mandrel of desired shape and size;
    over-wrapping the mandrel with multiple layers of a composite material, leaving at least one opening for installation of a coupling component;
    curing the composite material to form a hollow pressure vessel;
    removing the mandrel by washing it from the pressure vessel;
    forming at least one circumferential stringer for attachment to the pressure vessel; and
    embedding the at least one circumferential stringer in the pressure vessel by over-wrapping a portion of the circumferential stringer into the vessel to form an integral part thereof, wherein the embedding step is performed as part of the step of over-wrapping the mandrel and whereby the at least one circumferential stringer is embedded as an external appendage to the pressure vessel.

* * * * *